(12) United States Patent
Allen

(10) Patent No.: US 9,726,776 B2
(45) Date of Patent: Aug. 8, 2017

(54) TOWABLE TRANSIENT ELECTROMAGNETIC SURVEY DEVICE

(71) Applicant: GROUNDWATER IMAGING PTY LTD, Dubbo, New South Wales (AU)

(72) Inventor: David Allen, Dubbo (AU)

(73) Assignee: GROUNDWATER IMAGING PTY LTD. (AU)

( * ) Notice: Subject to any disclaimer, the term of this patent is extended or adjusted under 35 U.S.C. 154(b) by 316 days.

(21) Appl. No.: 14/458,927

(22) Filed: Aug. 13, 2014

(65) Prior Publication Data

US 2015/0048834 A1    Feb. 19, 2015

(30) Foreign Application Priority Data

Aug. 13, 2013    (AU) .................. 2013903043

(51) Int. Cl.
*G01R 35/00*    (2006.01)
*G01V 3/00*    (2006.01)
*G01V 3/08*    (2006.01)

(52) U.S. Cl.
CPC .................... *G01V 3/081* (2013.01)

(58) Field of Classification Search
CPC .................................... G01V 3/081

USPC .......................... 324/202, 326, 347
See application file for complete search history.

(56) References Cited

U.S. PATENT DOCUMENTS

2008/0007265 A1* 1/2008 Milne ............... G01V 3/083
324/347
2008/0308281 A1* 12/2008 Boutwell, Jr. ........ E21B 17/026
166/385

* cited by examiner

*Primary Examiner* — Farhana Hoque
(74) *Attorney, Agent, or Firm* — Polsinelli PC

(57) ABSTRACT

A towable transient electromagnetic survey device for connection to a land, water based or an airborne towing vehicle is provided. The towable transient electromagnetic survey device includes a central body structure and a number of booms extending therefrom to interconnect the central body structure to the towing vehicle and suspend a transmitter loop for generating a primary electromagnetic field. Receiving loop(s) and transmitter loop(s) may also be housed in the central body structure. The central body structure may also be configured for switching in and out of connection of various transmitter and receiver loop configurations. In particularly preferred arrangements, the location of a transmitter loop or a pair of transmitter loops relative to a receiver loop is effective for substantially nulling mutual inductance between the transmitter loop(s) and the receiver loop.

18 Claims, 12 Drawing Sheets

TOWABLE TRANSIENT ELECTROMAGNETIC SURVEY DEVICE

RELATED APPLICATIONS

This application claims priority to Australian Provisional Patent Application No. 2013903043 filed 13 Aug. 2013, which is hereby incorporated by reference in its entirety.

FIELD OF THE INVENTION

The field of the invention relates to transient electromagnetic survey devices for use in electromagnetic surveying of geological, geotechnical and soils mapping. The invention has many potential applications and is particularly suitable for use in electromagnetic surveying of ground water.

BACKGROUND OF THE INVENTION

Electromagnetic systems for surveying soils and the like generally involve the measurement of one or more electric or magnetic field components induced in the earth subsurface by changes in a primary field produced from variations in a current source. The primary field spreads out in space both above and below the ground and its change induces currents in subsurface conductors in accordance with the laws of electromagnetic induction. These currents give rise to secondary magnetic fields, which distort the primary field. In general, the resultant secondary field, the change of which may be picked up by a receiving coil, will differ from the primary field in intensity, and direction and reveal the presence of a conductor.

Electromagnetic methods are sensitive to variations in electrical properties of subsurface materials and can map out regions with enhanced conductivity due to the presence of fluids, metals, or other variations. Electromagnetic induction instruments induce currents in conductors within the subsurface without having to make direct contact with the ground.

Electromagnetic methods can be utilized to:
Map conductive soil and groundwater contamination.
Map soil moisture and salinity in agricultural areas.
Characterize subsurface hydrogeology (map buried channel deposits, groundwater exploration, locate conductive fault and fracture zones).
Characterize Geological Structure.

A typical electromagnetic method for mapping a subsurface geology includes placing a loop of wire (typically 10-300 meters square) on the ground surface. A steady current is passed through the loop and the transmitter emits a primary electromagnetic field for surveying ground heterogeneity beneath where the survey system is located. A receiver coil in the centre of or offset from the transmitter loop records the resultant electromagnetic field for processing and interpretation, with the resultant electromagnetic field corresponding to the interaction of the primary electromagnetic field with the underlying substrate.

The recorded or resultant electromagnetic field generally reflects a combination of the primary electromagnetic field emitted by the transmitter loop, as well as a secondary electromagnetic field emanating from the underlying substrate. Typically the secondary electromagnetic field emanating from the substrate is generally much smaller in amplitude than the primary electromagnetic field. A drawback of existing methods and systems is that often the primary electromagnetic field can overwhelm the receiver and interfere with its ability to sense the secondary electromagnetic field hence a reduced ability of the receiver to sense the secondary electromagnetic field.

It is known that the effect of interference from the primary electromagnetic field can be reduced by maintaining large separation between the transmitter and the receiver. One method is adopted where wire loops are manually laid on the ground and transmitter loop and receiver loop manually separated by a distance. However, with increased separation also comes further problems including one of interpretation of the resultant data wherein shallow resistivity variation with depth cannot be uniquely interpreted, and a second problem whereby if a large area is required to be surveyed, manual separation of loops is both inconvenient and tedious.

Some attempts have been made to improve efficiency by towing a transmitter and receiver loops behind land or water based vehicles. For example, a recent system has included a transmitter adapted for towing by a tow vehicle and a sled type structure supporting a receiver loop separated from the transmitter which is drawn in proximity to the ground over the surface behind the transmitter loop. In this apparatus, the strength of the primary electromagnetic field drops off steeply with distance from the outside of the transmitter. The receiver is therefore more readily able to detect the secondary electromagnetic field.

While this approach improves the rate of measurement in terms of area of mapping per time, and separates the transmitter and receiver loops sufficiently to reduce interference of the secondary signal, the apparatus is impractical because it is akin to a road train to the extent that it has very poor towing and turning circle ability, and reduced suitability for off-road surveys, and the strength of the secondary signal may be distorted by changes in ground heterogeneity between the transmitter and receiver in an un-interpretable manner as the receiver loop traverses the ground.

Some towed electromagnetic carts have been created where the transmitter loop support has been heavy and cumbersome. The transmitter loop must be large both for increasing depth of penetration and for increasing range of depth of investigation by minimizing the number of turns, that raise internal inductance, needed to transmit a magnetic moment of equivalent strength. A cart design is needed that is robust when towed through farmland but also easy to man-handle.

Other attempts have been made to increase the efficiency of subsurface mapping by providing airborne systems, however these systems are expensive, large and have large sampling footprints not suited to shallow and detailed exploration or to exploration of substrate in areas littered with numerous metallic features.

There remains therefore an ongoing need to provide an improved electromagnetic survey apparatus for transmitting and receiving electromagnetic fields to determine the features of the underlying substrate in an efficient and practical way. It would be particularly advantageous if the electromagnetic survey system allowed for reduced interference of the primary electromagnetic field with the receiver while providing a convenient and easy means for traversing and therefore mapping a large area.

It is an object of the present invention to substantially overcome or at least ameliorate one or more of the disadvantages of the prior art.

SUMMARY OF THE INVENTION

In an aspect, the invention provides a towable transient electromagnetic survey device for connection to a land or water based towing vehicle. A towable transient electromagnetic survey device according to this aspect may comprise:

a central body structure defining at least two substantially parallel and vertically spaced apart bounded planes, an upper plane and a lower plane;

a first boom configured to interconnect the central body structure to a towing vehicle in a spaced apart relation;

a second boom connected to and extending from the central body structure in a substantially opposite direction from the first boom;

at least two side booms extending from the central body structure;

a transmitter loop for generating a primary electromagnetic field suspended about the distal ends of the second and additional booms and about at least part of the boundary of the upper plane closest to the towing vehicle;

at least one receiver loop for receiving changes in secondary electromagnetic field signals from a survey subject, the receiver loop being located about at least part of the boundary of the lower plane; and a power supply connected to the transmitter loop and located in or on the vehicle or the central body structure.

An alternate towable transient electromagnetic survey device according to this aspect may comprise:

a central body structure defining three substantially parallel and evenly vertically spaced apart bounded planes, an upper plane, a middle plane and a lower plane;

a pair of transmitter loops for generating a primary electromagnetic field, each transmitter loop being located about the boundaries of the upper plane and the lower plane;

at least one receiver loop for receiving changes in secondary electromagnetic field signals from a survey subject, the receiver loop being located about at least part of the boundary of the middle plane;

a first boom configured to interconnect the central body structure to a towing vehicle in a spaced apart relation;

a second boom connected to and extending from the central body structure in a substantially opposite direction from the first boom;

at least two side booms extending from the central body structure;

an additional transmitter loop for generating a primary electromagnetic field suspended about the distal ends of the second and side booms and about at least part of the boundary of the upper plane closest to the towing vehicle;

a power supply connected to the transmitter loops and located in or on the vehicle or the central body structure, wherein in an operating condition the transmitter loops located about the boundaries of the upper plane and the lower plane are configured to be supplied with current from the power supply in opposite directions.

In arrangements of this aspect, the device may further comprise a towable receiver including an additional receiver loop for receiving changes in secondary electromagnetic field signals from a survey subject, the receiver loop being located about the boundary of the towable receiver. The central body structure may also be configured for switching in and out of connection of various transmitter and receiver loop configurations.

In another aspect, the invention provides a towable transient electromagnetic survey device for connection to an airborne towing vehicle. A towable transient electromagnetic survey device according to this aspect may comprise:

a central body structure defining at least two substantially parallel and vertically spaced apart bounded planes, an upper plane and a lower plane;

a fabric wing connected to the central body structure;

a first boom configured to interconnect the central body structure to an airborne towing vehicle in a spaced apart relation;

a second boom connected to and extending from the central body structure in a substantially opposite direction from the first boom;

at least two side booms extending from the central body structure;

a transmitter loop for generating a primary electromagnetic field suspended about the distal ends of the second and additional booms and about at least part of the boundary of the upper plane closest to the airborne towing vehicle;

at least one receiver loop for receiving changes in secondary electromagnetic field signals from a survey subject, the receiver loop being located about at least part of the boundary of the lower plane; and, a power supply connected to the transmitter loop and located in or on the airborne vehicle or the central body structure.

In arrangements of either aspect, the distal ends of the two side booms may be anchored to a point along the first boom by elastic cord. The second boom and/or the side booms may be collapsible. Any boom may be telescopic. The first boom may be telescopic. When the second boom and side booms are in a collapsed condition the device, excluding the first boom, may occupy an area of no more than about 1.2 meters wide and 2.4 meters length. The side booms may be removably connected to the central body structure.

Further, one or more turns of the suspended transmitter loop may be diverted about the boundary of the upper plane. Such an arrangement may allow the mutual inductance with the receiver loop to be substantially nulled. This may provide an overall less cumbersome structure combined with an increased tolerance, in mutual inductance nulling, to dimensional inaccuracy.

In particularly preferred arrangements of either aspect the location of a transmitter loop or a pair of transmitter loops relative to a receiver loop is effective for substantially nulling mutual inductance between the transmitter loop(s) and the receiver loop.

BRIEF DESCRIPTION OF THE DRAWINGS

Preferred embodiments of the invention will now be described with reference to the accompanying drawings wherein.

DESCRIPTION OF THE PREFERRED EMBODIMENTS

Figure 1:
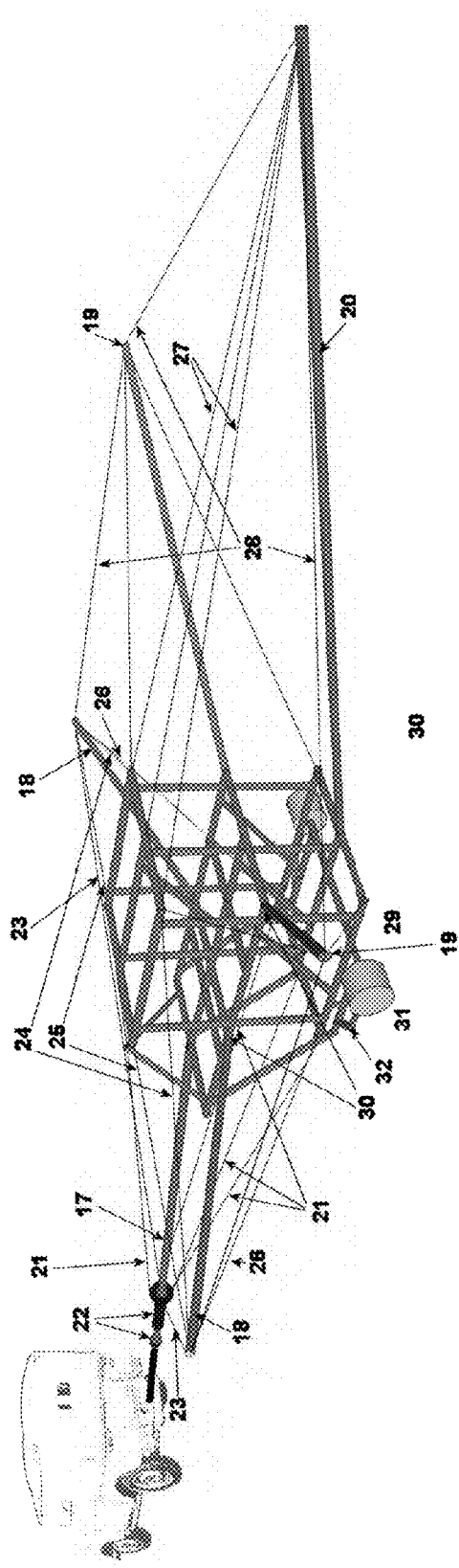
FIG. 1 is a perspective view of a towable transient electromagnetic survey device according to the invention in an operating position.

A towable transient electromagnetic system can be useful for revealing changes in electrical resistivity to 10 s, even 100 s of meters deep in the earth subsurface. Electrical resistivity images mainly reflect changes in groundwater salinity and saturation as well as rock porosity and clay content. Such a system needs to be largely non-metallic, that is, non-electrically conductive, as if too much metal is near or in the system then it may create unstable and useless data. TEM systems typically operate by transmitting a pulse of current into one large transmitter loop; the decay of this pulse induces current flow in the ground which dissipates downward and outward in a diffuse ring, slowing down and concentrating within bodies of low electrical resistance. One or more receiver loops then responds to the decay of the magnetic field of the diffusing current ring in the ground and from this response a sounding of electrical resistivity down through the ground can be obtained. Equipped with positioning apparatus (GPS), such a system logging data can be used to image vertical sections of electrical resistivity wherever it travels. In the context of this specification, a transient event is a short-lived burst of energy in a system caused by a sudden change of state. Transient electromagnetics, (sometime known as time-domain electromagnetics or TDEM), is a geophysical exploration technique in which electric and magnetic fields are induced by transient pulses of electric current and the subsequent decay response measured.

In preferred embodiments of the invention, one or more transmitting and one or more receiving loops are supported by a towable device comprising a central body structure defining three substantially parallel and evenly vertically spaced apart bounded planes, an upper plane, a middle plane and a lower plane. In other preferred embodiments, the central body structure defines at least two substantially parallel and vertically spaced apart bounded planes, an upper plane and a lower plane.

Preferably the middle plane extends forward (towards the towing vehicle) of the central body structure some distance to accommodate rigid placement of a receiver loop of as large a size as possible in a substantially horizontal plane in a low or null mutual coupling arrangement.

At least six booms may extend from this central body structure, one fore, a first boom interconnecting the central body structure to the towing vehicle, two side booms in a vertical plane across the front of the central body structure, two further side booms extending from the rear uprights of the central body structure in vertical planes containing those uprights and one aft, a second boom connected to and extending from the central body structure in a substantially opposite direction to the first boom.

A transmitter loop is comprised of one or more turns of insulated electrically conductive wire which may be grouped together or spaced apart from each other variably along their length. Preferably a transmitter loop is arranged in a manner that alters the primary magnetic field around the loop to alter self inductance within the loop and mutual inductance with a receiver loop. The turns are preferably connected in series and across all the turns, in parallel, a damping resistor is placed where the loop is connected to a transient current transmitting device. A transmitter loop is preferably sized and oriented in such a way as to effectively induce currents in the ground after energization with a transient current.

A receiver loop is comprised of one or more turns of insulated electrically conductive wire which may be grouped together or spaced apart from each other variably along their length. The turns are preferably connected in series and spaced apart or grouped together to alter self inductance. Across the loop terminals, it is preferred that a damping resistor is connected in parallel along with inputs to a voltage receiving and measuring device. A receiver loop is preferably sized and oriented in such a manner as to effectively detect changes in the magnetic field of currents inducted in a survey subject.

A large transmitter loop is preferably suspended about the distal ends of all the booms except the first boom and may be rigidly fixed across an upper front edge of the rectangular prism shaped central body structure. In other words, the transmitter loop is suspended about at least part of the boundary of the upper plane closest to the towing vehicle. Such a rigid fixing across the top front edge of the central body assists in maintaining geometric stability of the low or null mutual coupling between transmitter and receiver loops.

This large transmitter loop, along with the weight of the booms, ropes from the distal end of the second boom to the rear uprights of the central body structure, and ropes from the distal ends of the front side boom to the rear upper corners of the central body structure may help to keep the loop and booms extended with assistance from elastic cords extending from the distal ends of the front side booms to near the tip of the first boom. It is preferred that the distal ends of two front side booms are anchored to a point along the first boom by elastic cord.

Figure 12:
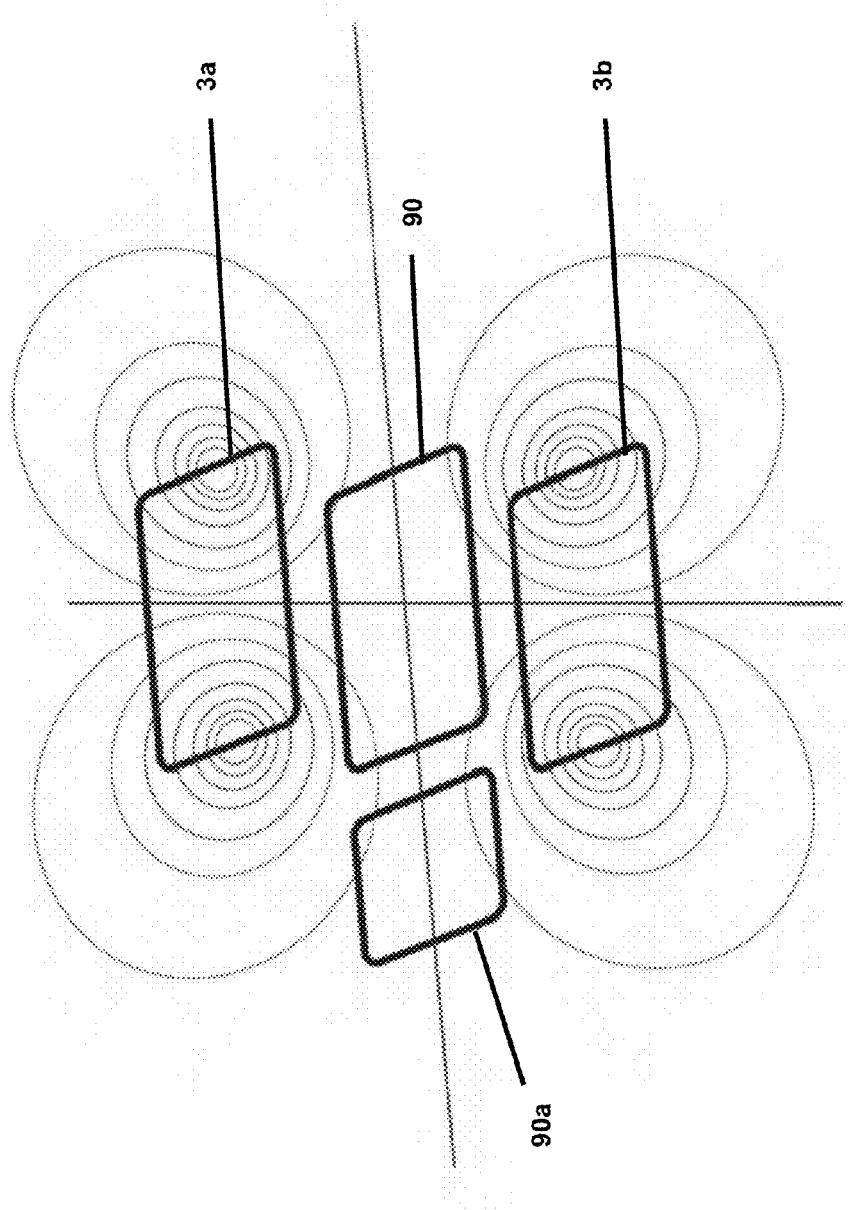
FIG. 12 is yet another schematic perspective view of transmitter and receiver loops about the three substantially parallel and evenly vertically spaced apart bounded planes defined by the central body structure of a towable transient electromagnetic survey device according to the invention.

The series of three substantially parallel and evenly vertically spaced apart bounded planes can be arranged to provide a receiving loop about the middle plane separating a pair of transmitting loops, and wherein in an operating condition the transmitting loops are supplied with current in opposite directions. In such an arrangement, the magnetic fields produced by the transmitting loops may sum to zero (or near zero) on the plane of the receiver loop and largely cancel out also in all parts of the ground apart from directly under the apparatus so as to allow improved mapping of very shallow ground features. See, for example, the schematic in FIG. 12 which depicts the receiving loop 90 separating the pair of transmitter loops 3a and 3b.

The central body structure preferably takes the form of a rigid framework core. In one example, the framework is formed of tubes which may host a plurality of loops that may be used for transmitting and/or receiving electromagnetic fields. Most preferably the framework is formed of glass-fibre tubes. Such rigid framework core may permit precise and dimensionally stable placement of these loops with respect to each other and with respect to the front edge of a large transmitter loop as discussed above. Where loops are precisely placed within tubes of the central body structure, individual turns may be spaced apart from each other and prevented from vibrating by placement around a flexible foam core or along a flexible but elastic sheet bent into a tube and slid within the tubes of the central body structure.

Figure 9:
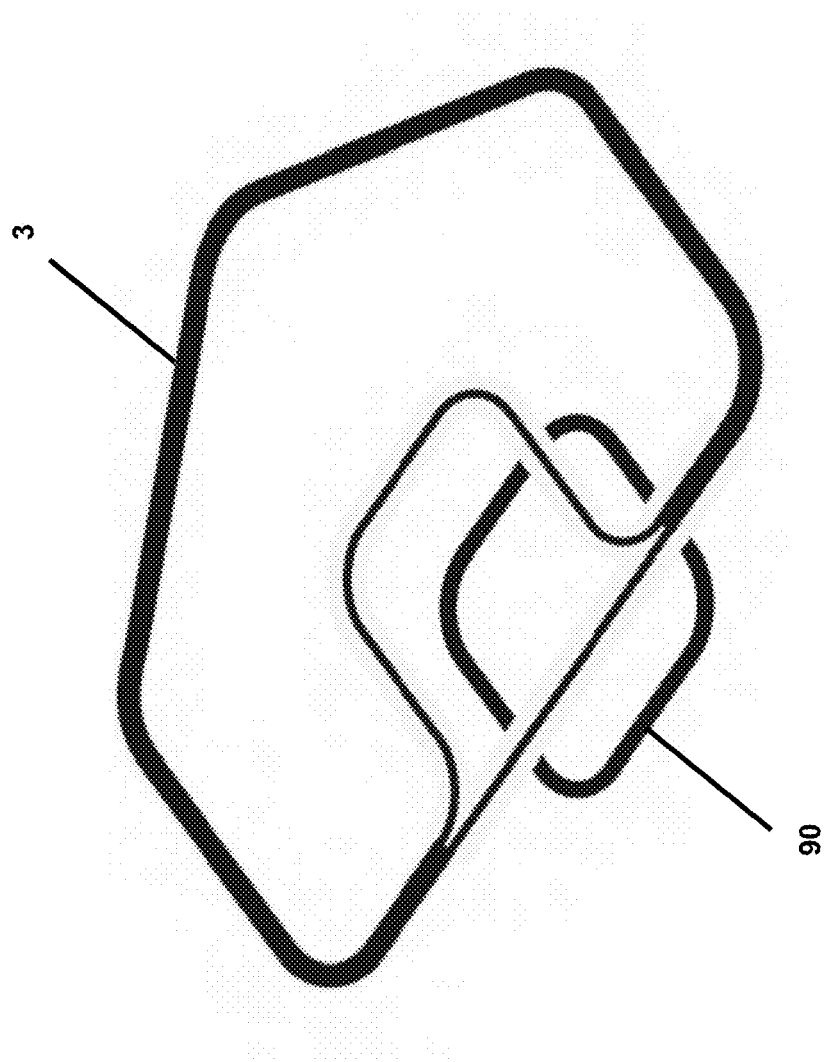
FIG. 9 is a schematic perspective view of a suspended transmitter loop with one or more turns of the transmitter loop diverted about the boundary of an upper plane above a receiver loop about the boundary of a lower plane, each plane being defined by the central body structure of a towable transient electromagnetic survey device according to the invention.
Figure 10:
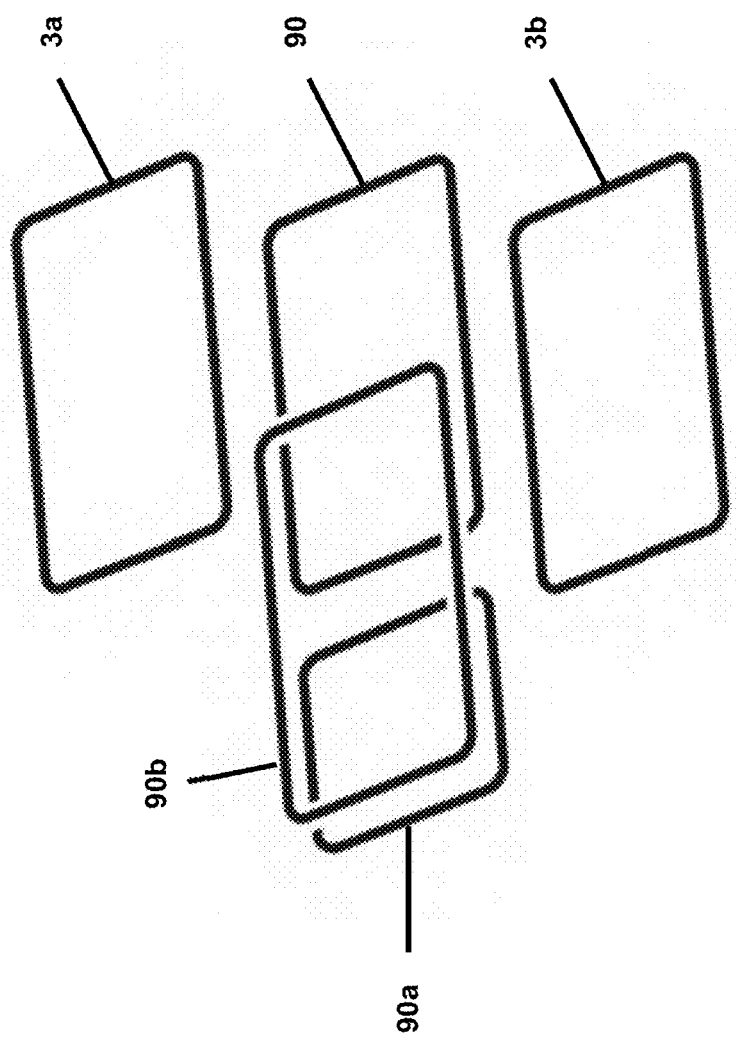
FIG. 10 is a schematic perspective view of transmitter and receiver loops about the three substantially parallel and evenly vertically spaced apart bounded planes defined by the central body structure of a towable transient electromagnetic survey device according to the invention.

Further, a central body structure of a rigid framework core may be sufficient for considerably reducing or nulling mutual inductance between pairs or groups of loops used together to conduct transient electromagnetic surveys. Stability of mutual inductance between a receiver loop placed substantially horizontally about part of the boundary of the middle plane towards the towing vehicle and the suspended transmitter loop may be achieved because parts of the suspended loop closer to the receiver loop are rigidly fixed in place at the top of the rigid framework core forming the central body structure. Some turns of the suspended transmitted loop front edge may be diverted around the rear of the rigid framework core top so that a larger receiver loop area can be compactly housed in the middle plane of the central body structure while maintaining mutual inductance nulling with the suspended transmitter loop. See, for example, the arrangement of the schematic depicted in FIG. 9 with transmitter loop 3 and receiver loop 90. The receiver loop area may assist with signal to noise ratio improvement and may enable the reduction of the number of turns in the loop so as to reduce problems of loop self inductance and amplification saturation that can be problematic particularly in shallow ground investigation. Operation of the suspended transmitter loop may be multiplexed with operation of smaller transmitter and receiver loops about the planes defined by the central body structure so that both shallow and deep exploration may occur in a single pass over a survey target. Such smaller loops may also be overlapped in ways that result in stable nulling of their mutual inductance.

Where the central body structure is a rigid core and rides across the ground on a pair or more of largely non-metallic wheels, or across water on a pair of floats, it may be towed by the first boom, held in place by taut rigging fixed to the front extremities of the central body structure and to a flanged sleeve at the other end of the first boom fixed to a pulley system or other mechanical leverage multiplication system used for tensioning the rigging. This arrangement, combined with optional telescoping of the booms, and removal of the wheel assemblies, facilitates compact packing and rapid transport of the system from site to site.

Figure 8:
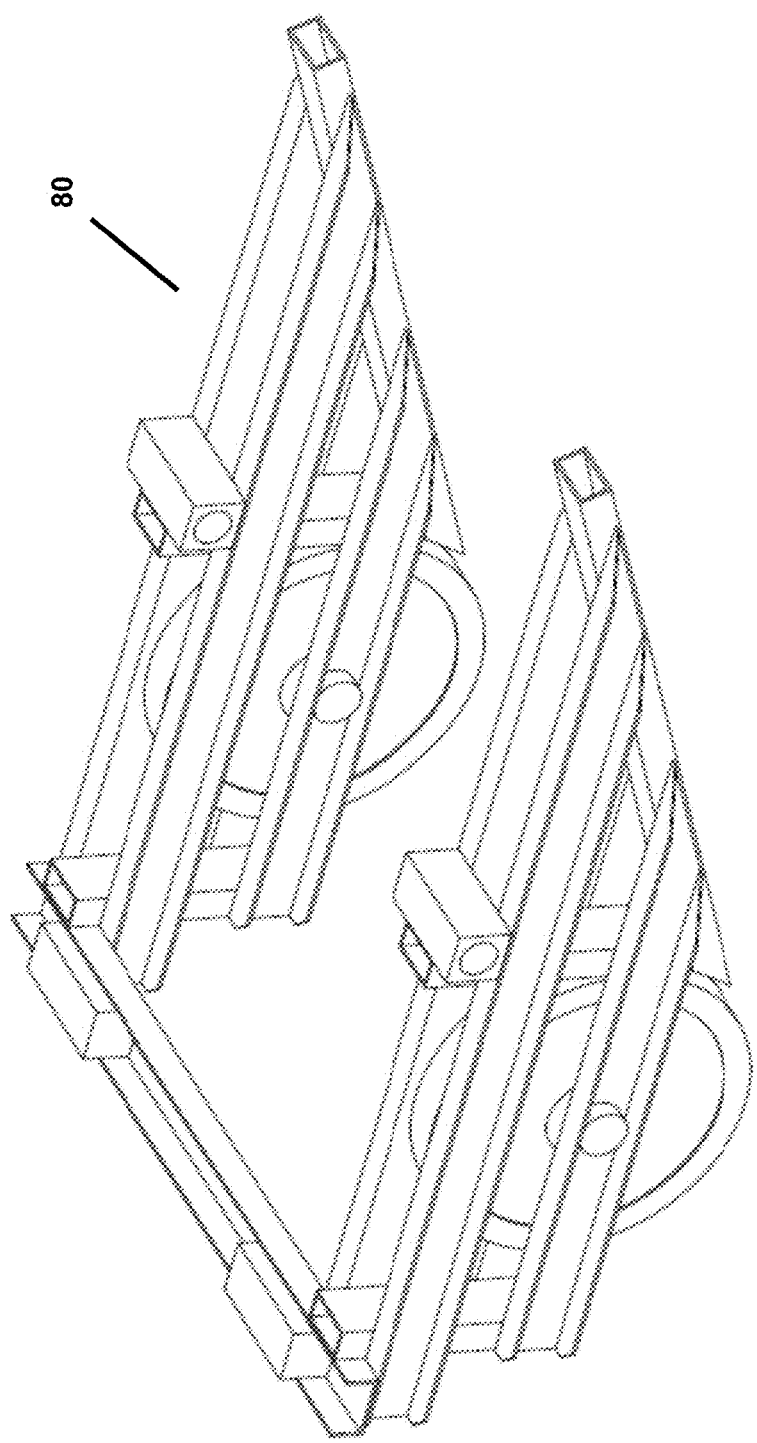
FIG. 8 is a perspective view of a preferred design of a trailer that would support the central body structure in a land based towing application of a towable transient electromagnetic survey device according to the invention.

In particular, the booms may be collapsible and configured to facilitate compact shipping/transport. The booms may be telescopic and may contract to manageable length for shipping/transport. The wheels and axle may be readily removed to reduce width and height of the device during shipping/transport, but may also span a reasonable width for stability and movement noise reduction in the receiver loop during operation. Preferably wheels have non-metallic hubs and the tyres are void of metal bead that causes inductive coupling problems with the sensing apparatus and are instead either urethane foam tyres, tyres with Kevlar bead, or are a urethane non-beading tube-tyre combination. For the purpose of increasing ground clearance between the wheels in off road operation, the wheels, with short axles, may be housed in framework with a large central ground clearance and which may be slid under the central body structure, fixed to it and for the purpose of absorbing impacts during motion, padded vertically from it. See, for example, trailer 80 depicted in FIG. 8.

Large versions of the device, wherein a detachable road registered dolly trailer may be slid under and fixed onto the device and a telescopic first boom retracted but still attached to the towing vehicle so that the whole system, with booms in a collapsed condition may become a road registered trailer for conventional travel between survey sites.

If the device is intended to be towed by a water-based vehicle, floats may be used in place of a wheel assembly. Where the towing vehicle is a motorized boat and the base of the central body structure may be watertight so that it may float, a wheel assembly may also be included in such a configuration.

Figure 2:
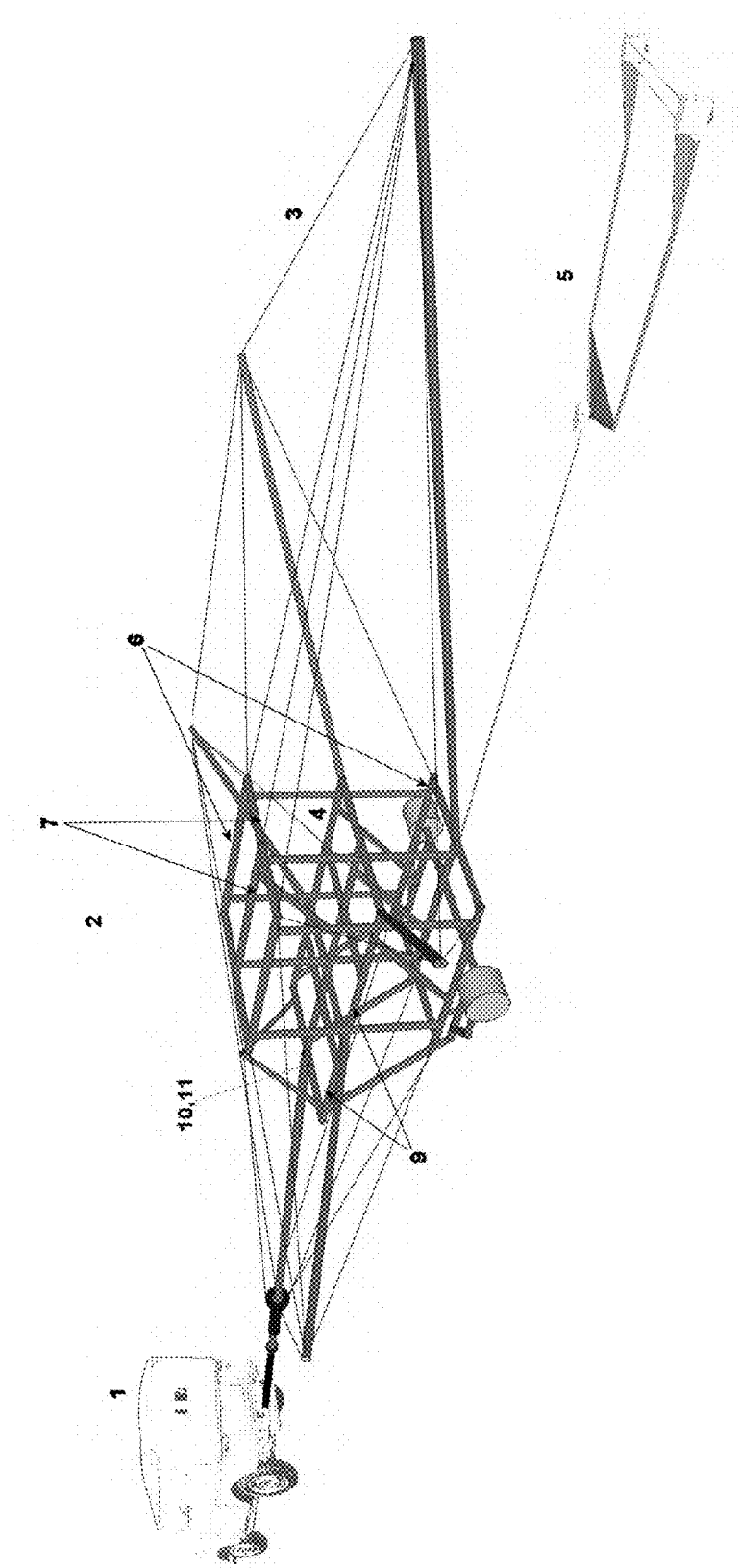
FIG. 2 is a detailed perspective view of a towable transient electromagnetic survey device according to the invention incorporating a towed receiver.
Figure 3:
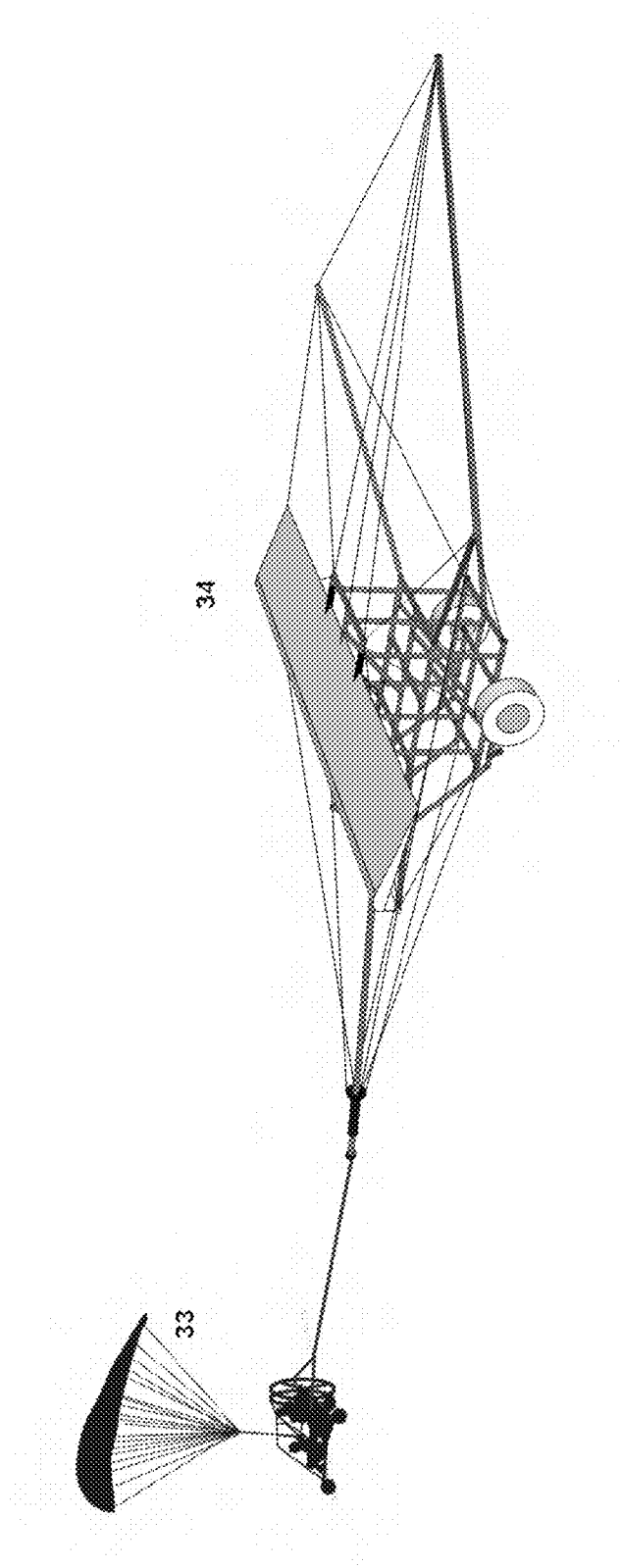
FIG. 3 is a perspective view of a towable transient electromagnetic survey device according to the invention for connection to an airborne towing vehicle.

Referring to FIGS. 1 through 3 there is shown a towable transient electromagnetic survey device 2 for connection to a land (FIGS. 1 and 2) or water based (FIG. 3) towing vehicle. The survey device 2 is designed to be towed by a vehicle 1 and includes both a transmitting arrangement and receiving arrangement for conducting geological survey, soil survey and/or geotechnical survey. The towing vehicle 1 may be any vehicle suited to the terrain being surveyed. In the case of land based surveying, a four-wheel-drive vehicle typically is used as it can double as a mobilization vehicle. Quad bikes and similar vehicles may also be used for greater versatility. Amphibious vehicles or boats may tow the electromagnetic survey device 2 in water.

In one embodiment, the electromagnetic survey device 2 has a central body structure 29. The central body structure 29 defines a bounded middle plane 4 between substantially parallel and evenly vertically spaced upper and lower planes 6. The middle plane 4 contains receiver loop(s) for receiving changes in secondary electromagnetic field signals from a survey subject, the receiver loop(s) being located about at least part of the boundary of the middle plane which may be null coupled with particular combinations of a pair of transmitter loops located about the boundaries of the upper plane and the lower plane in a dimensionally insensitive and stable manner. The survey device 2 may also include an additional transmitter loop 3. The central body structure 29 preferably includes relays, switches, damping shunt resistors and the like (not shown) to control the transmitting and receiving loop configurations. More preferably the middle plane 4 includes pre-amplifiers, loop oscillation damping resistors and relays or switches for switching in and out connection of various transmitter and receiver loop configurations and damping resistors to facilitate measurement using various transmitter and receiver loop configurations (not shown).

The central body structure 29 preferably retains sufficient dimensional stability to maintain mutual inductance nulling between the pair of transmitter loops about the upper plane and the lower plane, and the corresponding receiver loop of the middle plane 4 in the preferred embodiment. Preferably the central body structure 29 is braced and made of stable, non-electrically conductive material such as composites, glass-fibre and certain rigid, low thermal co-efficient of expansion plastics. The shape and configuration of the central body structure 29 may be determined by the type and deflection characteristics of the materials forming the central body structure 29. The upper plane 6 of the central body structure 29 may be removable or designed so that it can be folded down and forward to rest above the middle plane 4 to reduce its bulk during transport.

In one embodiment, a power supply for transient electrical current generating and transmitting means (not shown) is housed in the towing vehicle 1. In another embodiment, a power supply for transient electrical current generating and transmitting means (not shown) is partly or wholly housed in the central body structure 29 to reduce inductance and capacitance in the connecting cable between the power supply (not shown) and the transmitting loop(s). In a further embodiment, the towing vehicle 1 also hosts the data acquisition control and timing system (not shown) for co-ordinating the operation of the transmitting and receiving means. In another embodiment, the data acquisition control and timing system (not shown) may be wholly or partially incorporated on the survey device 2 to reduce inductance and capacitance in receiver loop connection cables. Similarly, a GPS device may be located in or on the towing vehicle 1 or the electromagnetic survey system 2. Other apparatus may also be mounted in or on either the towing vehicle 1 or the survey device 2 including magnetometers, ground penetrating radar, sonar devices, time lapse cameras and gamma ray spectrometers.

Figure 6:
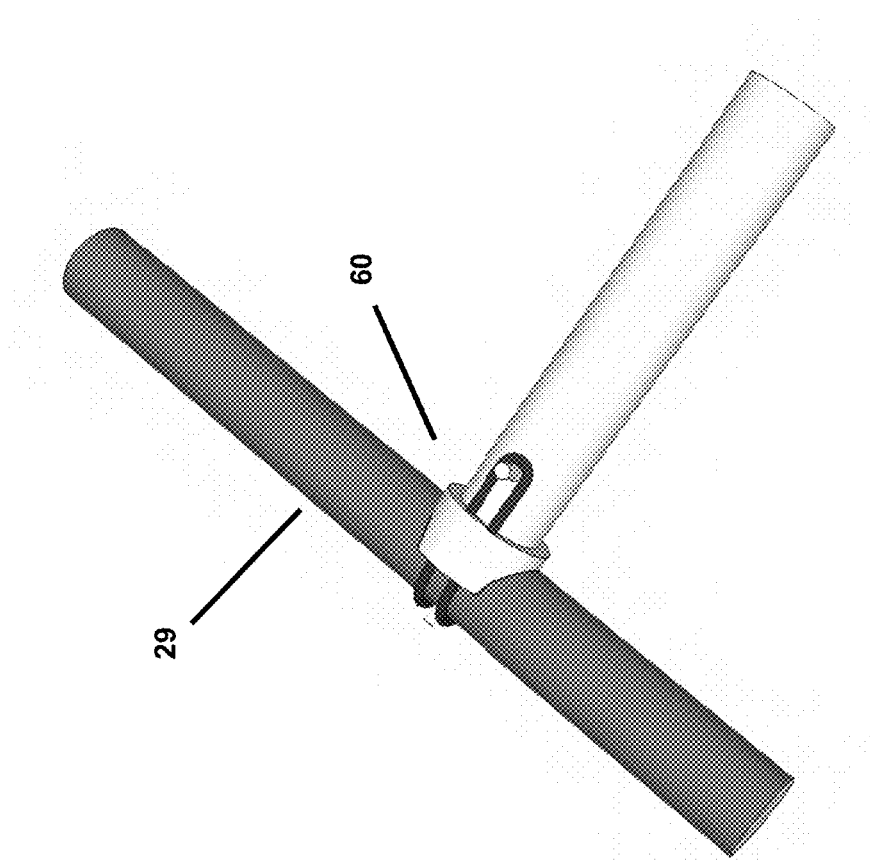
FIG. 6 is a perspective view of the preferred knuckle and tendon joint used to removably connect booms to the central body structure of a towable transient electromagnetic survey device according to the invention.

A series of booms are connected to the central body structure 29. Preferably the means of connection of the booms to the central rigid body 29 allows the booms to move in any direction upon impact of the electromagnetic survey device 2 with obstacles. Preferably a knuckle and tendon connection 60, an example of which is depicted in FIG. 6, is used to connect the booms to the central body structure 29. The knuckle is a fitting around the boom end that extends over the top and bottom of a tube on the central rigid block. The tendon extends out of the top and bottom of the knuckles and wraps around the central rigid block tube. It is preferably made of rubber and is fixed around a thick plastic rod within the ends of the booms.

The central body structure 29 is interconnected to a first boom 17 to provide a means of connection to the towing vehicle 1 while also maintaining sufficient separation from the towing vehicle 1 to keep the inductive effect of the transmitter on the largely metal towing vehicle and its effect on the received signals at manageable levels. Preferably the first boom 17 is made of composite material so it can resist significant compressive forces that might otherwise result in deflection and failure should another material be used in the same configuration. Preferably the first boom 17 is of sufficient length to keep the towing vehicle 1 at a sufficient distance from the central body structure 29 to avoid interference with the receiver loop(s). Preferably the first boom 17 is attached to the towing vehicle 1 by a weak replaceable link (see, for example, FIG. 7) so that upon impact of the central body structure 29 with immovable obstacles the survey device 2 breaks free from the towing vehicle 1.

Figure 7:
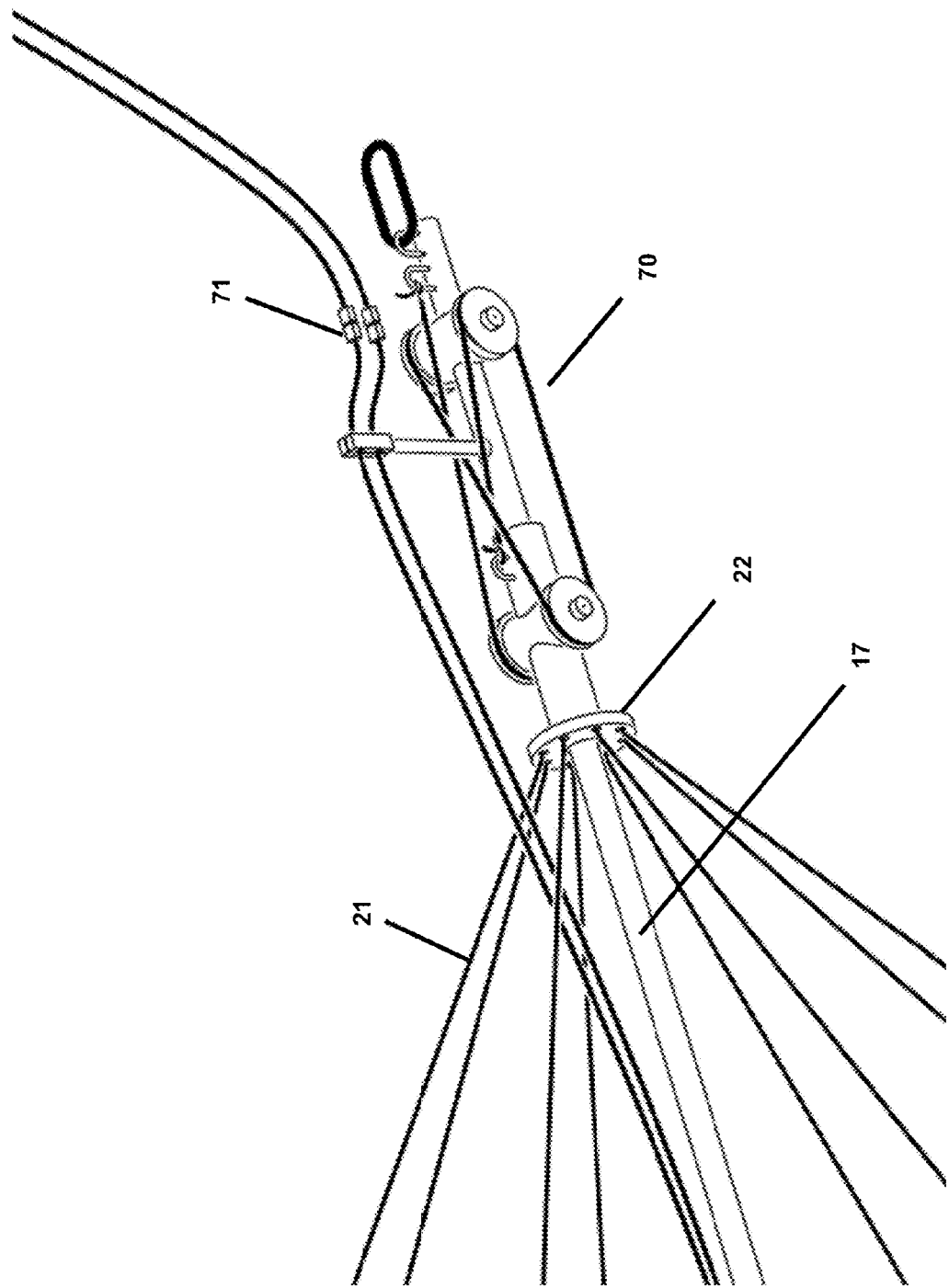
FIG. 7 is a perspective view of the preferred front boom rigging tensioning pulley system of a towable transient electromagnetic survey device according to the invention in which rigging is attached to a sliding sleeve and flange tensioned by a rope and pulleys.

As shown in FIG. 7, the first boom is preferably held in place in front of the central body structure by rigging attached to a flanged sleeve 22 on the first boom 17 near the towing vehicle that is attached to the distal end of the boom at the towing vehicle by, for example, a rope and a set of pulleys 70 so that the rigging can readily be tensioned appropriately. This arrangement may have more advantages in that the rigging deflects the towed survey device off obstacles that may otherwise damage it and it can endure considerable impacts without damage or adding significant weight.

The first boom tether lines 21 attach the first boom forward anchor point 22 to the central body structure 29. Preferably the first boom tether lines 21 are of sufficient strength to prevent the first boom 17 from being shifted from its attachment to the central body structure 29. In one embodiment, intermediate tether lines may be added to the centre of the first boom 17 to reduce deflection of the first boom 17 under stress.

A tether system may engage with the tether lines. The first boom tether system 22 (see FIG. 7) is a sleeve and flange located at the beginning of the first boom 17. The first boom tether lines 21 are attached to the flange 22 precisely to length, and the sleeve is pulled forward by a pulley and cord tackle system 70 also attached to the front end of the front boom 17. The sleeve may also host a series of pull-apart electrical connectors 71 that release the electrical cables passing from the towing vehicle to the central body structure 29 should it hit an obstacle and become detached from the towing vehicle 1.

A further series of side booms 18 and 19 are connected to the central body structure 29 to allow for suspension of the transmitter loop 3. The front side booms 18 and the rear side booms 19 may be telescopic to assist in transit of the survey device 2 between survey sites. Preferably the front side booms 18 and the rear side booms 19 are connected to the middle plane 4 of the central body structure 29, rather than to lower on the central body structure 29, to allow for improved clearance over ground obstacles such as fence posts, fences and vegetation. Preferably the length of the front side booms 18 and the rear side booms 19 are limited to make the survey device 2 a width such as determined legally for wide vehicles. For sole off road use, the length of the front side booms 18 and the rear side booms 19 are normally pragmatically limited by gaps between trees of a size that is common where the survey device 2 is in use or proposed to be used.

As shown in FIG. 2, forward tethers 23 anchor the distal ends of the front side booms 18 to a point along the first boom 17. Preferably the tension in the forward tethers 23 is balanced with the opposing force of the weight on the second boom 20 so that the respective booms do not bounce around but neither is the second boom 20 lifted up from its resting position upon movement of the central body structure 29 over rough ground. Preferably forward tethers 23 are elastic cords, such as, for example, solid rubber or one or more strands of rubber encased in a nylon or cotton braided sheath.

The front side booms 18 are interconnected to the top rear corners of the central body structure 29 by the rear tethers 24 and oppose the forward tethers 23 so that the front side booms 18 are tautly held and loop nulling is not unstable. Similar configurations of the survey device ensure loop nulling is not unstable although some flexibility is allowed in the movement of the transmitter and receiver loops. In one embodiment, the front side booms 18 are interconnected to the front upper corners of the central body structure 29 by the upper tethers 25. Turns of the transmitter loop 3 are attached along the upper tethers 25 and plugged into the central body structure 29 at the front upper corners.

A second boom 20 is also connected to the central body structure 29. The second boom 20 is preferably telescopic to assist in transport of the survey device 2 between survey sites. The second boom 20 can be longer than the front side booms 18 and the rear side booms 19 and may be formed of a framework structure to improve rigidity. The second boom 20 is preferably anchored to the lower plane 6 below the middle plane 4 to assist in reducing force applied to the second boom 20. In airborne embodiments of the survey device 2 (see FIG. 3) the second boom 20 is preferably anchored to the middle plane 4 as in airborne operation it must be tethered to prevent both upward and downward movement with respect to the central rigid body.

In another embodiment, the central body structure 29 may include receiver loops in vertical planes 7 for enhanced coupling with vertical ground bodies.

In one embodiment, the transmitter loop 3 is suspended about the distal ends of the front side booms 18, the rear side booms 19 and the second boom 20. In a preferred embodiment, the front of the transmitter loop 3 is passed over the top of the central body structure 29, in other words, the transmitter loop 3 is suspended about at least part of the boundary of the upper plane 6 of the central body structure 29 closest to the towing vehicle, rather than forward to the distal end of the first boom, to prevent it from inducing significant current in the towing vehicle 1 and to facilitate dimensionally stable nulling of mutual inductance between the transmitter loop 3, and an appropriately placed receiver loop about the middle plane 4. In order to maintain a large receiver loop area, thus obtaining improved data, while maintaining nulling of mutual inductance with the transmitter loop 3 and compactness of the central body structure 29, some or all of the turns of the transmitter loop 3 are diverted about the upper plane 6 of the central body structure 29.

The central body structure can also include a rig system. The rig system can include a plurality of holding arms mounted to the central body structure, wherein the arms when engaged by the transmitter loop hold the transmitter loop in a substantially fixed loop position. This structure allows the transmitter cable to be held tautly about the central body structure while enlarging its area considerably and may maintain a stable nulling distance between the receiver loop and proximal parts of the transmitter loop substantially independent of movement of other parts of the loops as the system moves over extraneous obstacles. Rather than extending the transmitter loop forward to attach to the first boom, which would bring it close to the towing vehicle and potentially induce problematic currents within that vehicle, the suspended transmitter loop is made to pass across the front of the central body structure as described before while the booms are fixed to the first boom by alternate flexible members.

In a preferred embodiment, the flexible members attaching the first boom to the front side booms are elastic such that the side booms are impact resistant and yield upon impact with extraneous obstacles while maintaining a mutual inductance nulling between the transmitter and the receiver substantially independent of extraneous obstacles. In this manner the rig system including holding arms can be adjustably mounted to the body to allow some suspension or movement in response to an obstacle so as to maintain and return to the exact, pre-determined locations that result in mutual inductance nulling between the main transmitter loop and the corresponding receiver loop. The holding arms can also be collapsible such that the survey device can be stored/transported.

In order to facilitate surface movement of the survey device 2, a wheel system 31 may be incorporated below the central body structure 29. In a preferred embodiment, the wheel system 31 does not have any significant metallic parts in which induction can create secondary electromagnetic fields that may dwarf the ground response. In order to reduce movement and vibration induced noise, the components of the wheel system 31 must have considerable impact absorption so soft wheels are preferred. Given the preferred light weight of the central body structure 29, simple foam or rubber parts may be used as suspension. In a preferred embodiment, obstacle deflectors 32 are connected to the central body structure 29 and the wheel system 31 to limit the wheel system 31 from impact with immovable obstacles.

In the embodiment shown in FIG. 2, there is also included a towed receiver 5 (described further below). Preferably the towed receiver 5 trails about 15 meters behind the central block structure 29 in an operating condition.

Figure 4:
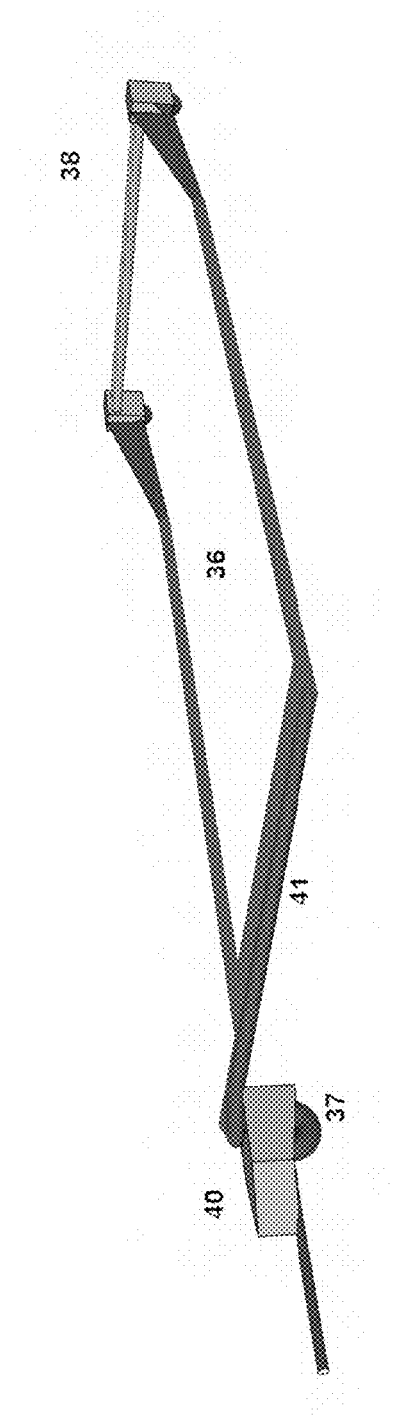
FIG. 4 is a perspective view of a towed receiver that may comprises part of a towable transient electromagnetic survey device according to the invention.

FIG. 4 is an illustration of the towed receiver 5. The towed receiver 5 can be used for extra deep substrate exploration. In particular, the receiver loop forming part of the towed receiver 5 is separated from the transmitter loop 3 by a considerable distance and is therefore less sensitive to the primary electromagnetic field and the secondary electromagnetic field generated directly beneath the transmitter. The towed receiver 5 has the benefit of detecting deeper ground features.

In one embodiment, the towed receiver 5 has a rectangular perimeter 36 formed from tubing. Preferably the tubing houses the receiver loop. Preferably the tubing is thick flexible PVC tubing or similar flexible material. The longitudinal sides of the rectangular perimeter 36 are preferably made of flexible material to substantially eliminate ground vibration and interference with the receiver. The rectangular perimeter 36 preferably flex when the towed receiver 5 is dragged around corners and over obstacles. The towed receiver 5 may incorporate apparatus 40 for recording electromagnetic fields such as a dampening resistor, pre-amp and a receiver cable.

The front of the towed receiver 5 may include an optional front separator and ground scrub deflector 41. The front separator and ground scrub deflector 41 may be encased in a replaceable plastic sheath to allow for renewal after damage from scrub and the like when the towed receiver 5 has been used in conducting electromagnetic surveying.

The towed receiver 5 has a front wheel 37 to assist in steering of the towed receiver 5 and in the reduction of drag and abrasion on the front of the towed receiver 5. In addition, a tether line and tether point assembly (not shown) assist in steering the towed receiver 5.

The towed receiver 5 also has a pair of rear wheels 38. The rear wheels 38 assist in movement of the towed receiver 5 including to reduce drag and abrasion of the rear of the towed receiver 5. A raised spacer housing the rear of the receiver loop and separating the rear wheels prevents the rear of the towed receiver loop 5 from being impacted by obstacles.

The towed received can have extra length added with extra sets of wheels and raised cross braces, or can be duplicated to permit a transmitter loop to be added, separated from the receiver loop, in the same way the receiver loop is housed, so that the system can be towed independently in, for example, forested areas where the system can only be towed along narrow tree lined tracks.

FIG. 3 is an embodiment of the survey device 2 for airborne use. An aircraft 33 such as a powered parachute (manned or unmanned) or crop-dusting aircraft modified for glider launching is connected to the survey device 2 by a releasable flexible cord. Preferably the aircraft 33 is a powered parachute, the slow speed of which is used to enable increased data collection per unit of distance travelled resulting in greater signal to noise ratio per unit of distance surveyed.

When used for airborne surveying, the survey device 2 may include a ram air canopy or other form of fabric wing 34. Preferably the fabric wing 34 is fixedly engaged with the upper region of the central body structure 29 and the front side booms 18. Preferably autonomous avionics are added so that the survey device 2 can remain airborne behind the aircraft 33 without the need for direct operator control.

Survey devices according to the invention for connection to an airborne vehicle may be designed to be towed into the air and landed again either under tow or autonomously after jettisoning and made out of light weight composite tube, combined with the booms but with the second boom supported from the middle plane and all booms anchored via flexible cords also to the lower plane and with:

- a wheel or skid attached to the front of the first boom;
- a wing attached spanning between the tips of the front side booms;
- an optional elevator at the tip of the second boom;
- a jettisonable tether cord attaching the first boom to an airborne vehicle; and
- autonomous avionics that detect tilt and the angle subtended between the first boom and the tether cord and operate in slave mode to the towing airborne vehicle so as to stabilize the loop support platform in the roll of and at constantly proportional elevation and pitch to the towing airborne vehicle.

Figure 5:
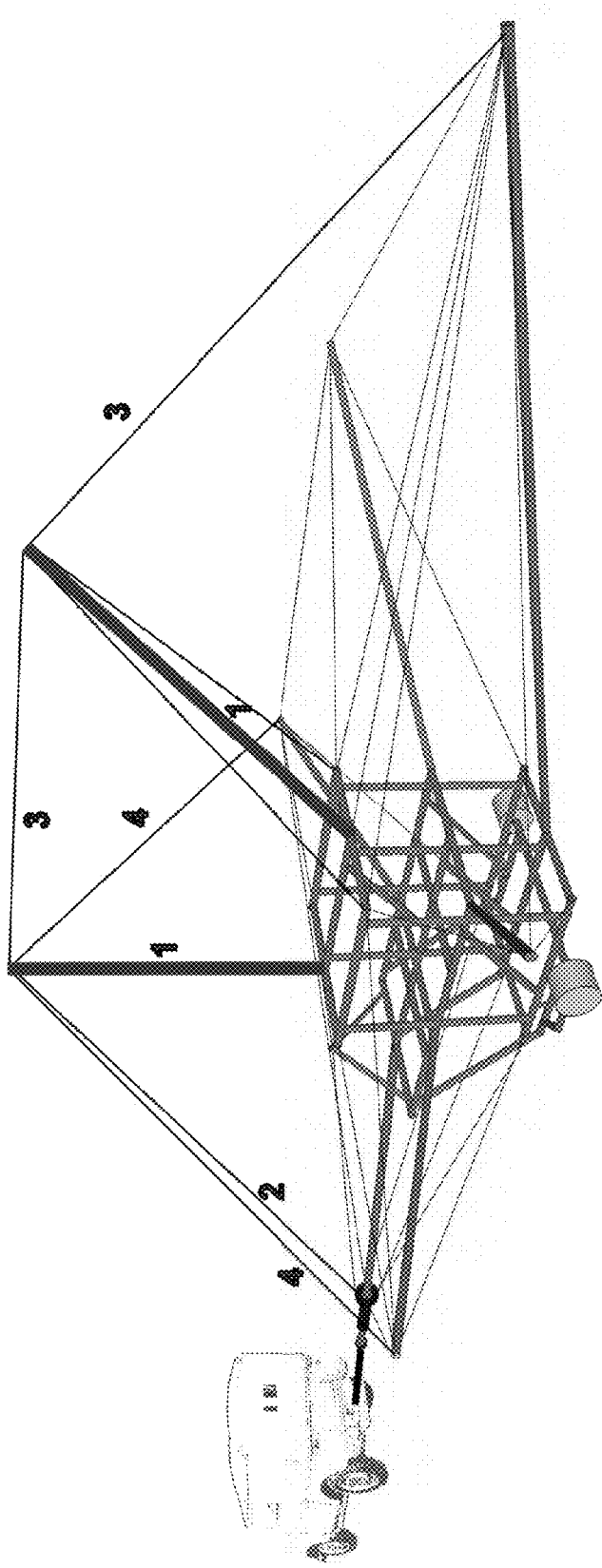
FIG. 5 is a perspective view of an alternate towable transient electromagnetic survey device according to the invention in an operating position.

Referring to FIG. 5, should a boom or booms 1 be attached to the central body structure in two vertical planes along the horizontal axis of symmetry and along the front edge of the horizontally disposed transmitter loops, so that there is at least one boom extending upward from the central body structure along the intersection of these two planes and loops be suspended and supported in these planes from the tips of these booms and tips of existing booms that support the horizontal loops and by fixture onto some of these booms and the rigid platform core then a system of three orthogonal large cross section area transmitter loops 3, 4 and the previously mentioned horizontally disposed transmitter loops can be supported for use in surveying with multiple fixed or mobile receivers and these loops may be tautly held in place separated from any metallic towing vehicle by one or more additional elastic cords 2 extending from the forward-most booms or boom to the front of the draw bar. This additional feature may be compatible with aspects of the invention disclosed in Canadian Patent Publication No 2829617A1, which is hereby incorporated by reference.

Additional booms may be added, at times, to the invention in two orthogonal vertical planes such that three orthogonal transmitter loops may be suspended. These may then be used with an array of receiver loops distributed over the ground over which the cart is driven, the operation of which is synchronised with operation of the transmitter loops, operating in multiplexed manner, by use of time signals transmitted by a satellite positioning system. Such a system facilitates very deep and detailed three dimensional resolution of a volume of the earth.

Figure 11:
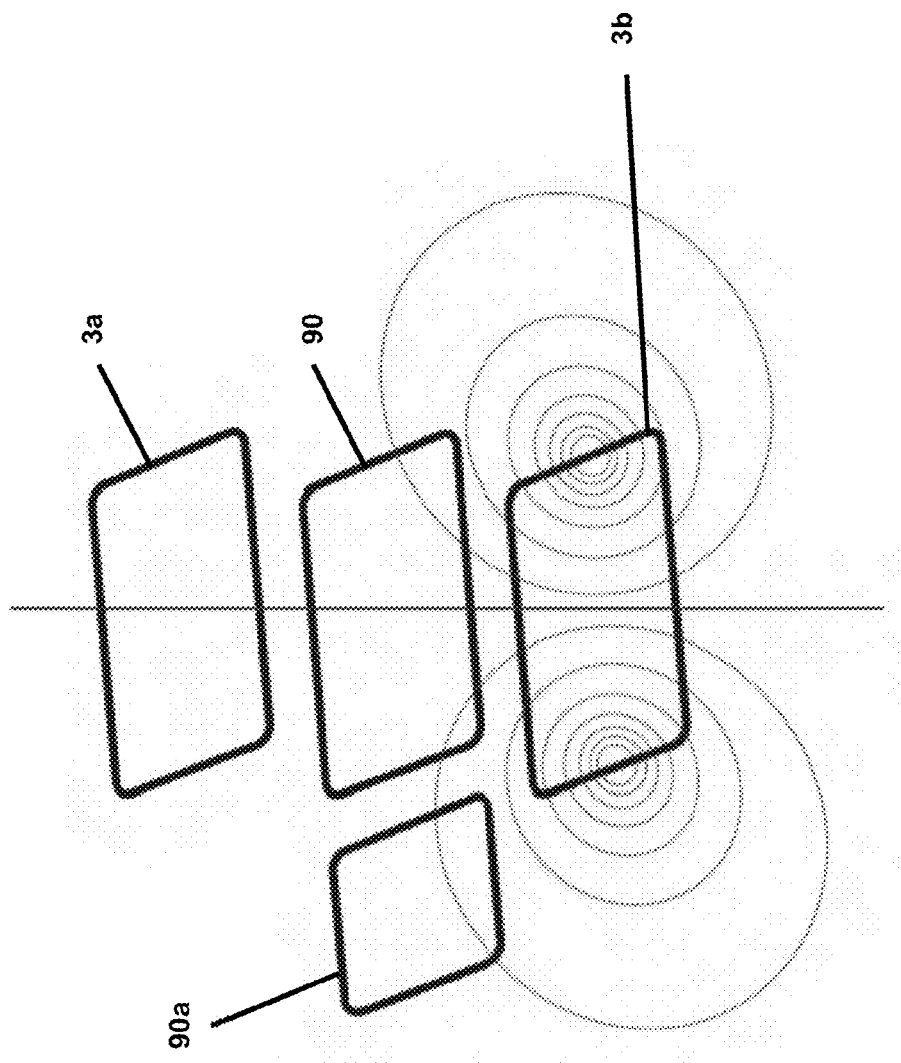
FIG. 11 is a further schematic perspective view of transmitter and receiver loops about the three substantially parallel and evenly vertically spaced apart bounded planes defined by the central body structure of a towable transient electromagnetic survey device according to the invention.

In a preferred embodiment, the electromagnetic survey device 2 may be equipped with various transmitter and receiver loop configurations (as in FIGS. 9 to 12) to allow for both shallow and deep electromagnetic surveys. For example, the combination of:

a) The transmitter loop 3 of FIGS. 1 through 3 with the receiver loop in the middle plane 4. This configuration is principally for exploration of a range of depths, including deep exploration, without the logistical difficulty of using the towed receiver 5.

b) The transmitter loop 3 of FIGS. 1 through 3, combined with the towed receiver 5 allows for electromagnetic characterisation of both shallow and deep bodies.

c) Shallow and high horizontal resolution electromagnetic surveys can be conducted when the lower plane acts as a transmitter loop 3b, combined with a receiver loop 90a fitted in the front of the middle plane 4 of the central body structure 29 so as to null couple (see FIG. 11).

d) The upper plane and lower plane 6 acting as transmitter loops 3a and 3b with opposing polarities and interacting with a middle plane 4 acting as a receiver loop 90 allows for electromagnetic surveys of the shallowest and most confined area beneath the central body structure 29. Through this combination, the receiver loop 90 in the middle plane 4 is null coupled and amplification may be increased resulting in considerable increase in signal to noise ratio without receiver self inductance or amplifier saturation problems. Further, dimensional stability of this arrangement is easy to achieve. (See FIG. 12)

e) The central body structure 29 may include vertical receiver loops and be used with any of the transmitters to facilitate improved coupling with and detection of vertical ground targets.

In a preferred embodiment, by use of relays controlled by the acquisition control unit, various combinations of configurations may be commanded to function in quick succession in a repeating sequence (multiplexed) so that they sample almost the same location and can be later processed in combination. Most typically, a configuration for deep investigation will be multiplexed with a configuration for shallow investigation so as to image a greater range of depths and improve resolution of all depths imaged in later processing. A simpler arrangement is to simply switch between configurations using switches between repeat passes over the same survey site. If only shallow electromagnetic survey is required at a particular site then the transmitter loop 3 of FIGS. 1 through 3 and its booms and rigging may be detached temporarily.

The receiver loop of the invention can be located centrally of the body and transmitter loop. Alternatively, in a further preferred aspect, the receiver loop can be mounted to the central body structure in offset relation to the transmitter loop. See, for example, offset receiver loops 90a and 90b relative to the pair of transmitter loops 3a and 3b in FIG. 10.

The arrangement whereby there are turns of the suspended transmitter loop diverted back over the top plane of the rigid core (see, for example, FIG. 9) has several benefits, including: 1) reducing the sensitivity of the exact position that results in nulling of mutual inductance between this loop and the corresponding offset central plane receiver loop, 2) enlarging this approximately horizontal primary magnetic field zone so that the receiver loop can be considerably enlarged to increase received secondary signal strength, reflecting ground body conductance, while maintaining low sensitivity to the primary field, and 3) moving the exact position that results in nulling inwards from the front edge of the transmitter loop so that the combined receiver loop and transmitter loop may be stably supported more compactly on a smaller, lighter, more robust structure without compromising sensitivity of the nulling arrangement.

The central body structure of the device may define only two substantially parallel and vertically spaced apart bounded planes, an upper plane and a lower plane, wherein the transmitter loop is mounted to the upper plane and the receiver loop is mounted to the lower plane in an offset relation to the transmitter loop. This configuration allows for shallow and high horizontal resolution of the electromagnetic surveys. This configuration may be energised in multiplexed manner to collect both shallow focused and deep focused datasets which can later be jointly processed to increase the depth range over which good resolution data may be obtained and, as a result, increase the overall resolution at all depths resolved.

Electromagnetic survey results from use of a preferred embodiment of the invention with:
  (iii) a slingram configuration of FIG. 2 wherein the transmitter loop 3 is operated with the towed receiver 5; and
  (iv) the transmitter loop 3 of FIGS. 1 through 3 with the receiver loop in the middle plane 4.

Both embodiments of the survey device 2 were used to survey an alluvial plain for the purpose of optimizing groundwater extraction for irrigation. The two datasets are similar in depth of investigation. Both were collected in equal amounts of time (4 hours) but over twice as much data could be collected with the faster more agile electromagnetic mapping device where the transmitter loop 3 was used with a receiver loop in the middle plane 4. Further, there are metal artefact responses left in the slingram configuration data simply because totally removing them would result in very little remaining data at all while the smaller near surface footprint of the electromagnetic mapping device of the preferred embodiment resulted in tight exclusion of metal object anomalies and little loss of data coverage.

As can be seen from the foregoing description of preferred embodiments of the invention, it is plain that the invention may incorporate one or more of the following advantages:

Nulling of mutual inductance between transmitting and receiving loops.

Reduced footprint of the device.

Ability to segregate near surface response from deeper response.

Relative ease of transport of the device.

Ability to tow the device through vegetation and over difficult terrain.

The invention represents a clear improvement over the prior art. For example, a compact configuration can now be achieved with both transmitter and receiver loops juxtaposed, and more precise data signals can be received for processing.

Additionally, should such a device be of particularly light weight, easy to tow through narrow gaps in vegetation, durable, and easy to set up, pack up and transport from one survey site to another, that would also be particularly advantageous. Light weight is particularly advantageous considering that wheels on such a device must be considerably free of metal to avoid interference with the measurements and such wheels with high weight bearing capacity are not readily available.

To the best of the inventor's knowledge, there does not currently exist a light weight durable airborne system that can readily be towed into the air, and landed again, by ultra-light aircraft such as powered para-foils, whether manned, semi-autonomous or autonomous. Neither is there a system that may function towed on land, water or in the air interchangeably depending on circumstances such as terrain and vegetation such that optimum survey cost and detail may be achieved.

Although preferred forms of the present invention have been described with particular reference to applications in relation to land based vehicles, it will be apparent to persons skilled in the art that modifications can be made to the preferred embodiments described above or that the invention can be embodied in other forms and used in alternative applications.

Throughout this specification and the claims which follow, unless the context requires otherwise, the word "comprise", and variations such as "comprises" and "comprising", will be understood to imply the inclusion of a stated integer or step or group of integers or steps, but not the exclusion of any other integer or step or group of integers or steps.

The reference in this specification to any prior publication (or information derived from it), or to any matter which is known is not, and should not be taken as an acknowledgment or admission or any form of suggestion that that prior publication (or information derived from it) or known matter forms part of the common general knowledge in the field of endeavour to which this specification relates.

The invention claimed is:

1. A towable transient electromagnetic survey device for connection to a land or water based towing vehicle, comprising:
  a central body structure defining at least two substantially parallel and vertically spaced apart bounded planes, an upper plane and a lower plane;
  a rigid first boom configured to interconnect the central body structure to a towing vehicle in a spaced apart relation;
  a rigid second boom connected to and extending from the central body structure in a substantially opposite direction from the first boom;
  at least two rigid side booms extending from the central body structure, wherein a distal end of each side boom is anchored to a point along the first boom by elastic cord;
  a transmitter loop for generating a primary electromagnetic field suspended about the distal ends of the second and additional booms and about at least part of the boundary of the upper plane closest to the towing vehicle;
  at least one receiver loop for receiving changes in secondary electromagnetic field signals from a survey subject, the receiver loop being located about at least part of the boundary of the lower plane; and
  a power supply connected to the transmitter loop and located in or on the vehicle or the central body structure.

2. The towable transient electromagnetic survey device according to claim 1, wherein one or more turns of the transmitter loop are diverted about the boundary of the upper plane.

3. The towable transient electromagnetic survey device according to claim 2, further comprising a towable receiver including an additional receiver loop for receiving changes in secondary magnetic field signals from a survey subject, the receiver loop being located about the boundary of the towable receiver.

4. The towable transient electromagnetic survey device according to claim 3, further comprising switches located in the central body structure configured for switching in and out connection of various transmitter and receiver loop configurations.

5. The towable transient electromagnetic survey device according to claim 1, wherein the second boom and the side booms are collapsible.

6. The towable transient electromagnetic survey device according to claim 5, wherein the first boom is telescopic.

7. The towable transient electromagnetic survey device according to claim 5, wherein when the second boom and side booms are in a collapsed condition the device, excluding the first boom, occupies an area of no more than about 1.2 meters wide and 2.4 meters length.

8. The towable transient electromagnetic survey device according to claim 1, wherein the side booms are removably connected to the central body structure.

9. A towable transient electromagnetic survey device for connection to a land or water based towing vehicle, comprising:
- a central body structure defining three substantially parallel and evenly vertically spaced apart bounded planes, an upper plane, a middle plane and a lower plane;
- a pair of transmitter loops for generating a primary electromagnetic field, each transmitter loop being located about the boundaries of the upper plane and the lower plane;
- at least one receiver loop for receiving changes in secondary electromagnetic field signals from a survey subject, the receiver loop being located about at least part of the boundary of the middle plane;
- a first boom configured to interconnect the central body structure to a towing vehicle in a spaced apart relation;
- a second boom connected to and extending from the central body structure in a substantially opposite direction from the first boom;
- at least two side booms extending from the central body structure;
- an additional transmitter loop for generating a primary electromagnetic field suspended about the distal ends of the second and side booms and about at least part of the boundary of the upper plane closest to the towing vehicle;
- a power supply connected to the transmitter loops and located in or on the vehicle or the central body structure,
- wherein in an operating condition the transmitter loops located about the boundaries of the upper plane and the lower plane are configured to be supplied with current from the power supply in opposite directions.

10. The towable transient electromagnetic survey device according to claim 9, wherein one or more turns of the transmitter loop are diverted about the boundary of the upper plane.

11. The towable transient electromagnetic survey device according to claim 10, further comprising a towable receiver including an additional receiver loop for receiving changes in secondary electromagnetic field signals from a survey subject, the receiver loop being located about the boundary of the towable receiver.

12. The towable transient electromagnetic survey device according to claim 11, further comprising switches located in the central body structure configured for switching in and out connection of various transmitter and receiver loop configurations.

13. The towable transient electromagnetic survey device according to claim 9, wherein the distal ends of two side booms are anchored to a point along the first boom by elastic cord.

14. The towable transient electromagnetic survey device according to claim 13, wherein the second boom and side booms are collapsible.

15. The towable transient electromagnetic survey device according to claim 14, wherein the first boom is telescopic.

16. The towable transient electromagnetic survey device according to claim 14, wherein when the second boom and side booms are in a collapsed condition the device, excluding the first boom, occupies an area of no more than about 1.2 meters wide and 2.4 meters length.

17. The towable transient electromagnetic survey device according to claim 13, wherein the side booms are removably connected to the central body structure.

18. A towable transient electromagnetic survey device for connection to an airborne towing vehicle, comprising:
- a central body structure defining at least two substantially parallel and vertically spaced apart bounded planes, an upper plane and a lower plane;
- a fabric wing connected to the central body structure;
- a first boom configured to interconnect the central body structure to an airborne towing vehicle in a spaced apart relation;
- a second boom connected to and extending from the central body structure in a substantially opposite direction from the first boom;
- at least two side booms extending from the central body structure, wherein a distal end of each side boom is anchored to a point along the first boom by elastic cord;
- a transmitter loop for generating a primary electromagnetic field suspended about the distal ends of the second and additional booms and about at least part of the boundary of the upper plane closest to the airborne towing vehicle;
- at least one receiver loop for receiving changes in secondary electromagnetic field signals from a survey subject, the receiver loop being located about at least part of the boundary of the lower plane; and,
- a power supply connected to the transmitter loop and located in or on the airborne vehicle or the central body structure.

* * * * *